United States Patent Office 2,831,579
Patented Apr. 22, 1958

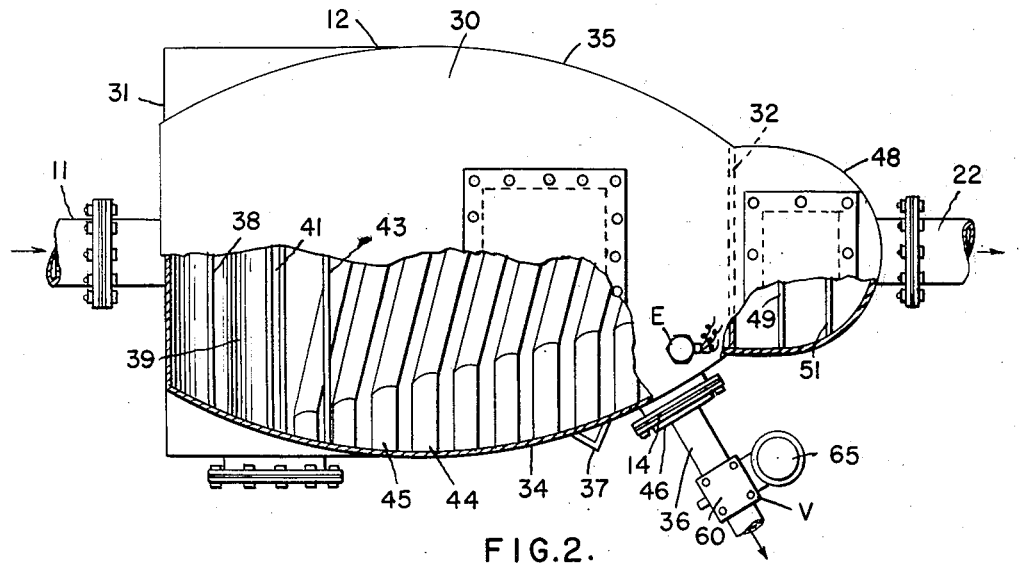
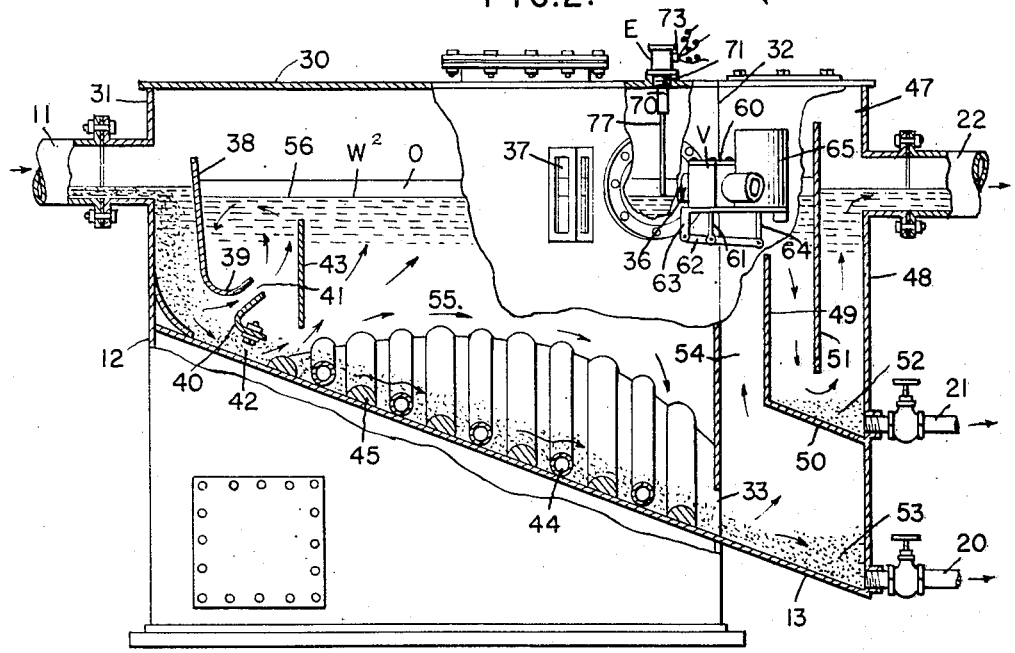
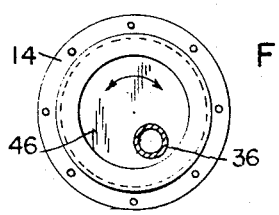
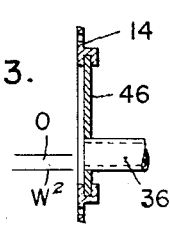

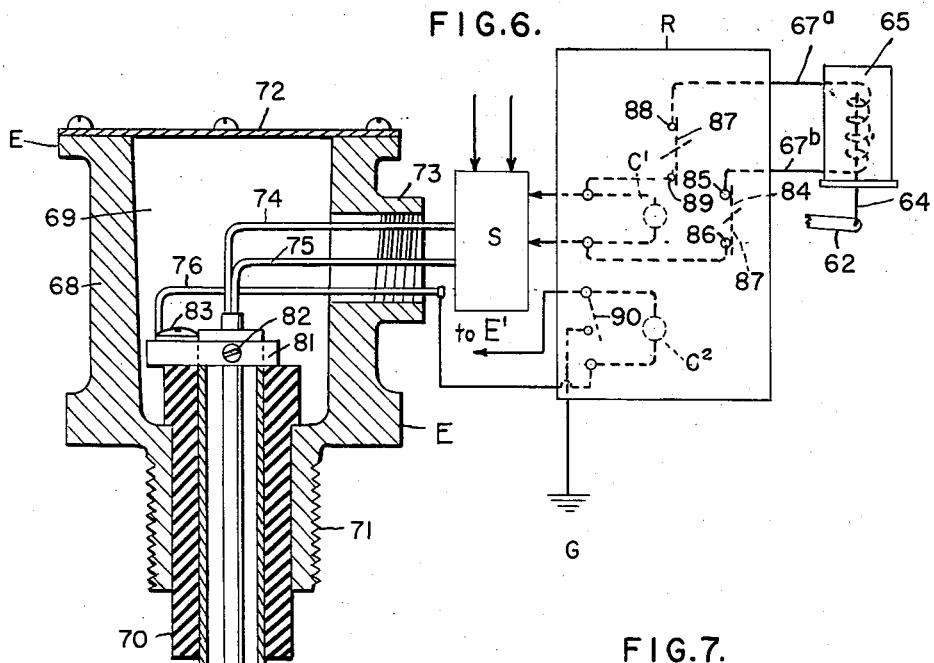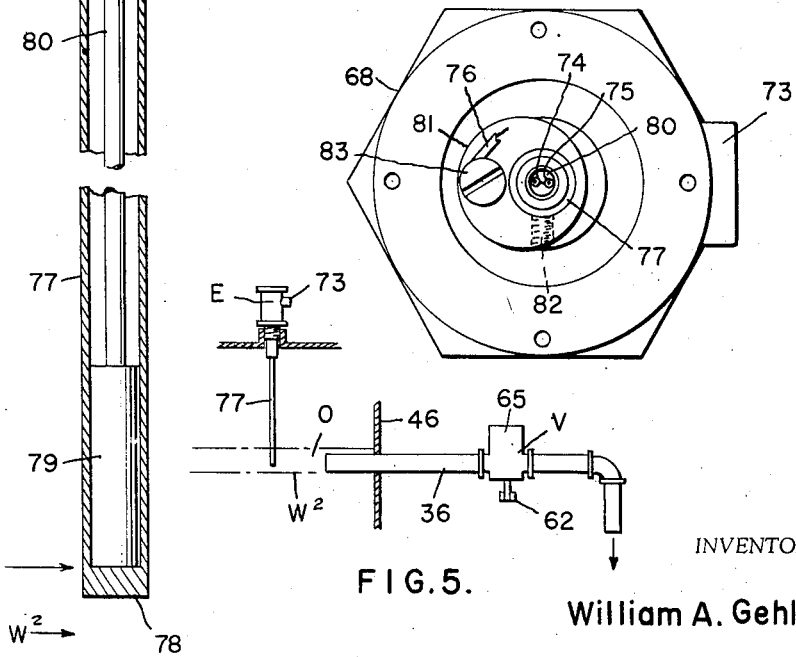

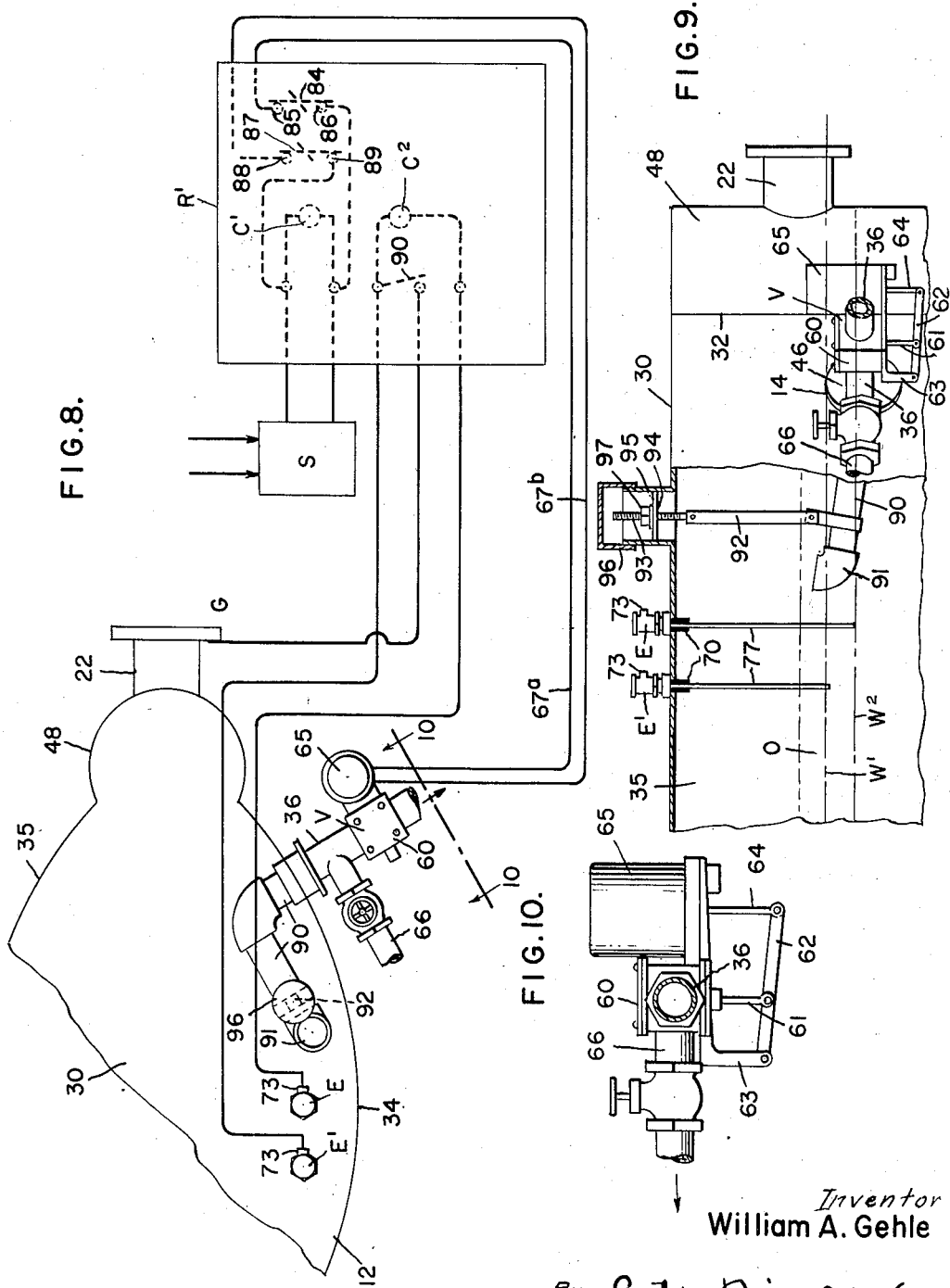

2,831,579

APPARATUS FOR REMOVING OIL FROM OIL AND WATER MIXTURES

William A. Gehle, Upper Montclair, N. J., assignor to Gale Separator Co., Inc., Bloomfield, N. J., a corporation of New Jersey Application November 3, 1954, Serial No. 466,501

9 Claims. (Cl. 210—143)

This invention relates to the treatment of polluted industrial liquid waste from machine shops, railroad diesel shops, steel plants and the like, which liquids, while mainly water, contain contaminating components, such as oil, grindings, grit and other debris. So waste liquids have to be treated to remove their contaminating impurities before their waters are suitable to be released from sewers into streams in treated non-polluting condition. Such separating treatment can be carried out by the ways and means shown in the patent to Gehle No. 2,502,142, of March 28, 1950, which discloses a separator basin or chamber with a sloping bottom into which the oily waters are fed, and from which clarified waters are released, while within the chamber is intercepted and separated oil from the infed waters, wherein it is impounded as a floating layer of oil. In the patent, this oil layer is shown as being drawn off intermittently, so it is an object of this invention to devise ways and means for drawing off the oil automatically.

As the supernatant oil layer builds up or accumulates in depth, the water-level of the subnatant body of water from which the oil has been intercepted and separated tends to be lowered. So there is, during operation, a variation in the elevation of the water-level. Therefore, it is an object of this invention to make use of this variation of water-level for operating an electric circuit for controlling a solenoid-valve on the oil draw-off pipe on the separator. To realize that object, this invention proposes the use of an electrode on the separator projecting downwardly through the non-conducting oil layer into the subnatant conducting water but so critically proportioned as to length that when there is any appreciable amount of oil in the oil layer, the electrode is out of contact with the water and thus its circuit is broken which is not restored again until the oil layer has been drawn off through operation of the solenoid-valve on the oil draw-off pipe to such an extent that the water-level rises sufficiently to complete the circuit once more with the electrode, whereupon the solenoid-valve is rendered inoperative. When the electrode circuit is open, the solenoid-valve circuit is closed, and vice versa. So another object of this invention is to devise details of construction for carrying out conjointly cooperative functional relationships between the assembly of electrode and valve and as to the layer of impounded oil. Since this layer of oil sometimes is in emulsified form, it is another object of this invention to devise an electrode with heating element means associated therewith for lowering the viscosity of the oil layer in the vicinity of that part of the electrode that penetrates that layer.

The invention therefore is directed to improving on the separator of the Gehle patent that has a chamber bottom sloping downwardly from the inlet baffle to the outlet baffle to intercept a body of quiescent liquid therebetween to the top of which floatable particles rise and collect as an oily layer thereon that is fluctuating as to its depth. The improvement comprises means for discriminatingly discharging oil from the layer thereof characterized by a solenoid operated valve on the oil draw-off or drain pipe controlling oil flow through that pipe, an electric circuit for the valve, an electrode extending into the separator chamber down to the liquid level of the water as it is when there is no supernatant oily layer to depress it, an electric circuit for the electrode, and interconnecting means between the circuits whereby when intercepted oil in the layer rises to an elevation above the minimum, the solenoid valve is opened by its circuit to drain oil from that layer and when oil in the layer is so drained down to expose the water whose water-level thus rises, the solenoid valve is closed.

The best embodiment of the invention now known to me is shown in the accompanying drawings but it is to be understood that this showing is illustrative and not limiting because since obviously changes can be made both in detailed construction and arrangement of parts without departing from the spirit and scope of this invention, whose metes and bounds are defined in the appended claims. But it is to be recalled that equivalents are also contemplated so long as they are equivalents of the elements used, or of the conjointly cooperative functioning thereof.

The invention is illustrated in the accompanying drawings in which Figure 1 shows a top plan view with parts broken away, of the oil intercepting and separating basin or chamber; Fig. 2 is a side elevational view thereof, also with parts broken away; Fig. 3 is a front view of the means for adjusting or correlating the elevation of the draw-off or drain-off pipe 36; while Fig. 4 is a sectional view, otherwise similar to Fig. 3; Fig. 5 is a rather schematic view showing the relationship of the bottom of the electrode E to the variable height oil layer O and the water-level $W^2$; Fig. 6 is a vertical sectional view through the electrode assembly E but with a diagram of its circuits; Fig. 7 is a plan view of the electrode assembly E; Fig. 8 is a top plan view of a modified form of draw-off pipe 36, and the use of two electrode assemblies E and E' with the circuits; Fig. 9 is a side elevational view of the draw-off pipe and the electrodes of Fig. 8; and Fig. 10 is a vertical elevational view of the solenoid-valve V and the draw-off pipe.

The incoming polluted waste liquids to be treated, inflow or are pumped to the treatment system through valved pipe 11, into an oil intercepting and separating basin or chamber 12, of the type shown in the patent to Gehle, No. 2,502,142 of March 28, 1950. Suffice it to say at this time that it has a downwardly sloping bottom 13, with an adjustable oil outlet assembly 14, hereinafter described in more detail. Heavier settled solid particles are removed from the intercepting basin 12 through bottom drain or discharge pipe 20 and less heavy settled particles through drain or discharge pipe 21. Liquid from which oil has been intercepted and separated in basin 12, overflows from the basin through valved outlet pipe 22 whose effective elevation determines the liquid-level in the basin 12. The basin 12 has a top 30, an infeed end wall 31, a bottom 13 sloping downwardly therefrom to a wall 32 at the outlet end, apertured at 33 near its bottom together with side walls 34 and 35 respectively, outwardly bowed or curved as shown. The bottom 13 is curved upwardly at its sides to meet the lower edges of the side walls 34 and 35. As previously described, intercepted and separated oil is bled off through the adjustable oil outlet 14 comprising a rotationally adjustable apertured disc 46 from whence it flows to further treatment through oil draw-off or drain pipe 36 that is eccentrically mounted in that disc. The level of the oil in the basin can be seen through the sight glasses 37.

Oily water entering the separator basin 12 through infeed pipe 11, encounters a baffle 38 that is substantially vertical but has a curved lower section 39, closely associated with which is a peculiarly shaped bottom baffle 40, that makes with the curved section 39 of the vertical baffle, a neck-like upper passageway 41, while beneath the baffle 40 and the bottom 13 is another but lower passageway 42. 43 is another vertical but submerged baffle that does not rise to the liquid level. 44 and 45 represent liquid-riffling ribs or riffles uprising from the sloping bottom 13 of the oil-intercepting basin. 44 may be pipe-like and spray jets of water either upwardly or downwardly therefrom. Extending beyond end wall 32 of the basin is an outlet column arrangement 47 connected with outflow pipe 22. It has a curved end wall 48 and is adapted to house a lower angular baffle having a vertical portion 49 and an inclined portion 50 connecting the baffle to the curved end wall 48. 51 is a straight vertical baffle between the angular baffle and the outlet pipe 22. Heavier particles or solids-discharge pipe 20 is connected with the chamber 53 formed below the inclined portion 50 of the baffle 49, while the lighter particles or solids-discharge pipe 21 is connected with the chamber 52 formed thereabove. 54 indicates an upflow passageway between 49 and 32. O indicates the floating layer of impounded oil, while therebelow is represented the current of flowing watery liquid 55 having a relatively quiescent body 56 on top thereof. The changeable water-level of the watery body 56 is indicated by the letter $W^2$ when depressed and by the letter $W'$ when normal and undepressed by an oil layer.

Contaminated liquids and especially oil and water mixtures, are fed to the basin 12 through pipe 11, whereupon the incoming liquids encounter the vertical baffle 38 and are deflected downwardly as shown by the arrow, toward the bottom 13 of the basin to be again deflected by the peculiarly shaped baffle 42 partly through upwardly extending upper passageway 41 and partly through the downwardly extending lower passageway 42. This is for starting the separable oil to begin to rise while letting the heavier components descend further. The rising particles are deflected upwardly by the submerged vertical baffle 43 so the separating oil particles are again facilitated in rising to collect in a floating layer O thereof on or over the mass of subjacent liquid passing downwardly to the outlet 33. In so flowing downwardly, the other liquid encounters the transverse riffles or ribs 44 and 45 which tend to deflect upwardly any entrained free oil, and when so deflected, it rises to add itself to the collected layer of oil O floating on top of the liquids passing through the basin. Thus, there is a supernatant layer of oil O, intercepted and separated from the subnatant strata of downwardly flowing oil-carrying water.

After the water gets out of the bottom outlet 33, it enters the chamber 53 where some sedimentation takes place and then it rises through upflow passage 54 that lies between the vertical baffle 49 and the end wall 32 of the basin. After so doing, it descends between the vertical baffle 49 and the vertical baffle 51, to flow into chamber 52 where the liquid is subjected to further sedimentation. Then it rises upwardly between baffles 51 and the curved end wall 48 to discharge through outlet pipe 22. Coarser or faster settling suspended solids entrained in the waters passing out through the outlet 33, tend to settle out in the chamber 53 as shown by the dots, and this sand, grit, shavings, or whatever type of heavy contaminant solids are in the waters, can be drained out through the heavy solids discharge pipe 20. Finer or slower settling suspended solids are carried upwardly with the moving column of waters until the chamber 52 is reached, whereupon they tend to settle out, as shown by the lesser dots there, which solids can be drained out through the lighter solids-discharge pipe 21. Thus between the curved end wall 48 and the end wall 32 of the basin, there is in effect a column of generally upflowing liquid from which free floatable oil has been intercepted and separated into a layer of impounded oil that is of variable or fluctuating depth. From this impounded layer of floating oil, a quantity thereof is drawn off from the basin or chamber 12 through draw-off or drain pipe 36. The level of the floating oil layer O can be viewed through the sight glass 37. When that level changes, the elevation of the draw-off pipe 36 can be changed to suit, by rotatably shifting the rotatable disc 46 to raise or to lower the height of the draw-off pipe 36.

So much then for the environment or background of the present invention which is directed to means for discriminatingly discharging oil from the layer thereof through the draw-off pipe 36 through the wall of the basin or chamber 12. On the draw-off pipe 36 is mounted solenoid valve V made up of a valve-casing 60 housing a valve that is not shown but which has a depending valve-stem 61 operated by a lever 62 fulcrumed on an arm 63, which lever is motivated by the reciprocable core 64 of a solenoid 65. Disposed in the draw-off pipe 36 before it gets to the solenoid valve V, is a valved bleed-off stub pipe 66. The solenoid 65 is in an electrical circuit 67a and 67b that will be described later, but in essence the valve is normally closed when its electrical circuit is open and is only open when its electrical circuit is closed.

Functionally associated with the solenoid valve is a pair of electrodes E and E', the electrode E having its lower or free end projecting lower than the upper electrode E'; the details of one of the identical electrodes is shown in Fig. 6. It has a main body portion 68 with a bore 69 into which is secured a tube of insulation 70 depending through a lower or bottom screw-threaded section 71 that is screwed into the top of the basin or chamber 12. The screw-threaded section 71 is rather long to provide means for regulating the elevation of the electrode with respect to the variable water-level W. The electrode assembly has a top plate 72, and a side outlet 73 through which pass essentially wires 74 and 75 of one circuit, and wire 76 of another circuit. Depending from the casing or body 68 to an extent beyond the insulation 70 is a hollow electrode 77 having a closed bottom 78 in which is housed a heating element 79 connected by a stem 80. Stem 80 depends from a plate or disc 81 to which it is fastened by a set-screw 82, and through which plate its wires 74 and 75 pass. The same plate is arranged, with proper insulation, to support the hollow electrode 77, and a terminal screw 83 to which its electrical wire 76 is attached. Power for a normal electrical power line comes into box S, from which it is distributed by suitable switches not only to the operating elements but to the relay box R.

In the dual electrode E assembly used as shown in Fig. 6, the heater element is operated from its own circuit 74 and 75 to the main switch box S. But the electrode 77 through its wiring 76, through switch box S, forms a secondary circuit $C^2$ grounded at G on the separator basin, such as at its outlet 22, and through the watery body in the separator basin. The primary circuit $C^1$ includes the solenoid 65 of the solenoid valve V., a relay 84 having pole faces 85 and 86, and a second relay 87 having pole faces 88 and 89. When the water level is such as to contact both the upper and lower electrodes E and E', the circuit $C^2$ is complete and current will flow in that circuit as induced by the primary circuit C'. The circuit C² includes windings which operate simultaneously the relays 84 and 87 and the relay of circuit C² which controls switch member 90 and consequently the connection of ground G with electrode E'. Relays 84 and 87 are normally closed while switch 90 is normally open when circuit C² is de-energized or incomplete. When the water level falls below a point of contact with upper electrode E', circuit C² will remain complete inasmuch as switch 90 maintains the ground connection normally produced by the upper electrode. However, when the water level falls below lower electrode E, circuit C² is broken, switch 90 is opened and relays 84 and 87 are closed, thus de-energizing the solenoid valve and opening the valve to permit the body of oil to drain off. Since switch 90 is normally open, when the water level attains a level such as to contact lower electrode E', circuit C² will remain incomplete. Under these conditions, that is, while the water level is rising during drain-off, circuit C² will be completed only when both the upper and lower electrodes have been engaged by the rising water level, re-establishing circuit C², closing relay switch 90 and the relays 84 and 87 to shut off the drain valve.

As an alternative, a single electrode may be used. In this case, one side of circuit C² will be directly grounded while the other side is connected to the single electrode. Also, circuit C² will contain the winding for a single relay controlling energization of the solenoid valve.

Referring once more to the draw-off or drain pipe 36, and particularly to Figs. 8 and 9, it may be important under certain conditions to have that pipe extend through the side 34 of the basin 12 as shown at 90 in those figures, with an elbow 91 inlet that can be adjusted very precisely to the proper elevation to correspond with the oil-depressed water-level W² or the normal non-oil-depressed water-level W' at the top of the subnatant water layer. This can be accomplished by the hanger strap 92 terminating in a screw-threaded stem 93, passing through plate 94 in an exterior casing 95 on the top 30 of the basin 12, that has a cover-plate 96. By removing the cover-plate 96, the operator can put a wrench into the casing 95 and operate an adjusting nut 97 on the threaded stem 93 of the strap 92 that adjustably raises and lowers the effective elevation of the elbow 91.

I claim:

1. Continuously operable apparatus for treating waste water polluted and contaminated with floatable oily particles to intercept and separate the oil from the water, which comprises an intercepting and separating covered chamber having an inlet pipe for incoming polluted or contaminated liquid from which oil is to be separated; a discharge pipe for water from which oil has been intercepted and separated whose inlet elevation determines the general liquid level in the chamber; means for feeding polluted liquid to the inlet pipe; means in the chamber for intercepting a body of quiescent watery liquid to the top of which floatable particles rise and collect as a supernatant oil layer on the subnatant body of water whose water-level rises and falls fluctuatingly in proportion to the height of the supernatant oil layer accumulating thereon; and means for discriminatingly discharging oil from the layer thereof including an oil discharge pipe through the wall of the chamber at an elevation lying within the range of fluctuations of the oil layer, a solenoid-operated valve controlling oil-flow through the pipe, an electric circuit for the valve, a generally vertical electrode extending into the chamber down to reach the water-level of the water therein as it is when no supernatant oil layer is present to depress it, an electric circuit for the electrode, and interconnecting means between the circuits whereby when intercepted oil in the layer rises to an elevation that immerses the terminal end of the electrode the solenoid valve is opened by its circuit to drain oil from that layer and when oil in the layer is so drained down to expose the terminal end of the electrode to the water the solenoid valve is closed.

2. Apparatus according to claim 1, wherein the electrode is hollow but closed at its bottom.

3. Apparatus according to claim 1, wherein the electrode is hollow and surrounds a heating element for lessening the viscosity of the oil layer adjacent the electrode.

4. Apparatus according to claim 1, wherein the electrode depends from the cover on the chamber.

5. Apparatus according to claim 1, wherein the electrode depends from the cover on the chamber, and has means for regulating the elevation of the terminal end of the electrode to be co-extensive with the liquid-level of the water in the chamber only when that liquid-level is not substantially depressed by a supernatant oil layer.

6. Apparatus according to claim 1, wherein the solenoid-operated valve is normally closed.

7. Apparatus according to claim 1, wherein the electrode circuit is open when the oil layer is present and closed when it is not, wherein the solenoid valve is normally closed, and wherein the interconnecting means includes a relay for closing the solenoid circuit to open the solenoid valve only when the electrode circuit is open.

8. Continuously operable apparatus for treating a heavier liquid polluted and contaminated with floatable oily particles to intercept and separate the oil from the liquid, which comprises an intercepting and separating covered chamber having an inlet for incoming polluted or contaminated liquid from which oil is to be separated; an outlet for liquid from which oil has been intercepted and separated whose elevation determines the liquid level in the chamber; means for feeding polluted liquid to the inlet; baffle means within the chamber for deflecting downwardly incoming feed liquid; baffle means extending from above to significantly below the liquid level and forming an uprising column with which the outlet is connected; means for overflowing separated heavier liquid from the chamber; a chamber-bottom sloping downwardly from the inlet baffle means to the outlet baffle means to intercept a body of quiescent liquid therebetween to the top of which floatable particles rise and collect as an oily layer thereon; and means for discriminatingly discharging oil from the layer thereof including a pipe through the wall of the chamber, a solenoid valve controlling oil-flow through the pipe, an electric circuit for the valve, an electrode extending into the chamber down to the liquid-level of the heavier liquid therein as it is when there is no supernatant oily layer to depress it, an electric circuit for the electrode, and interconnecting means between the circuits whereby when intercepted oil in the layer rises to an elevation above the minimum the electrode is inactivated and the solenoid valve is opened by its circuit to drain oil from the layer and when oil in the layer is so drained down to expose the heavier liquid the electrode is activated and the solenoid valve is closed.

9. Continuously operable apparatus for treating waste water polluted and contaminated with floatable oily particles to intercept and separate the oil from the water, which comprises an intercepting and separating covered chamber having an inlet for incoming polluted or contaminated liquid from which oil is to be separated; a discharge pipe for water from which oil has been intercepted and separated whose elevation predetermines the liquid level in the chamber; means for feeding polluted liquid to the inlet; means in the chamber for intercepting a body of quiescent watery liquid to the top of which floatable particles rise and collect as a supernatant oil layer of fluctuating depth on the subnatant body of water whose water-level rises and falls complementally in proportion to the depth of the supernatant oil layer fluctuating thereon; and means for discriminatingly discharging oil from the layer thereof including an oil outlet pipe through the wall of the chamber at an elevation reachable by the watery layer when its rise is maximized, a solenoid-operated valve controlling oil-flow through the pipe, an electric circuit for the valve, a pair of electrodes extending into the chamber, one of said electrodes extending down to reach the predetermined liquid level and the other electrode extending to a point somewhat below the first electrode, an electric circuit for the electrodes including a relay switch for grounding the first electrode, and interconnecting means between the circuit whereby when intercepted oil in the layer depresses the water below the second electrode the solenoid valve is opened by its circuit to drain oil from that layer and when oil in the layer is so drained down to permit the water to engage the first electrode the solenoid valve is closed.

References Cited in the file of this patent
UNITED STATES PATENTS

| | | |
|---|---|---|
| 1,080,113 | Kugelgen et al. | Dec. 2, 1913 |
| 1,907,001 | Peter | May 2, 1933 |
| 2,047,989 | Woelflin | July 21, 1936 |
| 2,216,977 | Mahone | Oct. 8, 1940 |
| 2,380,436 | Holdman | July 31, 1945 |
| 2,502,142 | Gehle | Mar. 28, 1950 |
| 2,670,848 | Houten et al. | Mar. 2, 1954 |